(12) United States Patent
Yoshino et al.

(10) Patent No.: US 10,404,977 B2
(45) Date of Patent: Sep. 3, 2019

(54) DISPLAY DEVICE, USAGE MANAGEMENT METHOD AND PROGRAM OF A DISPLAY DEVICE

(71) Applicant: NEC Display Solutions, Ltd., Tokyo (JP)

(72) Inventors: Michio Yoshino, Tokyo (JP); Masakazu Kobayashi, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 15/523,652

(22) PCT Filed: Dec. 3, 2014

(86) PCT No.: PCT/JP2014/082009
§ 371 (c)(1),
(2) Date: May 1, 2017

(87) PCT Pub. No.: WO2016/088225
PCT Pub. Date: Jun. 9, 2016

(65) Prior Publication Data
US 2017/0318286 A1 Nov. 2, 2017

(51) Int. Cl.
*H04N 21/41* (2011.01)
*H04N 17/00* (2006.01)
(Continued)

(52) U.S. Cl.
CPC ............. *H04N 17/004* (2013.01); *G09G 5/00* (2013.01); *G09G 5/003* (2013.01); *G09G 5/006* (2013.01);
(Continued)

(58) Field of Classification Search
CPC ...... H04N 17/004; H04N 9/31; H04N 9/3191; G06Q 30/0645
See application file for complete search history.

(56) References Cited

U.S. PATENT DOCUMENTS 5,533,123 A * 7/1996 Force .................... G06F 21/10
380/2
5,999,921 A * 12/1999 Arsenault ........ G07B 17/00193
700/306
(Continued)

FOREIGN PATENT DOCUMENTS

CN 203606828 U 5/2014
JP 2006-268296 A 10/2006
(Continued)

OTHER PUBLICATIONS

International Search Report (ISR) (PCT Form PCT/ISA/210), in PCT/JP2014/082009, dated Mar. 10, 2015.
(Continued)

*Primary Examiner* — Robert J Hance
(74) *Attorney, Agent, or Firm* — McGinn IP Law Group, PLLC (57) ABSTRACT

Provided is a display device that has a usage validity period and confirms that the device is within the usage validity period when it is used, and can be improved in usefulness and can be used quickly, as well as a usage management method and program for the display device. The display device includes: a real-time clock; and, a control unit that, upon receiving a video display-ON signal for turning on video display under the condition that the status of the real-time clock is invalid, displays video corresponding to an input video signal.

15 Claims, 4 Drawing Sheets

(51) Int. Cl.
*G09G 5/00* (2006.01)
*H04N 9/31* (2006.01)
*G06Q 30/06* (2012.01)

(52) U.S. Cl.
CPC ......... *H04N 9/3182* (2013.01); *H04N 9/3191* (2013.01); *H04N 9/3194* (2013.01); *H04N 21/4122* (2013.01); *G06Q 30/0645* (2013.01); *G09G 2330/022* (2013.01); *G09G 2330/026* (2013.01); *G09G 2330/027* (2013.01); *G09G 2370/22* (2013.01)

(56) References Cited

U.S. PATENT DOCUMENTS

| | | | | |
|---|---|---|---|---|
| 2003/0233553 | A1* | 12/2003 | Parks | G06F 21/725 |
| | | | | 713/178 |
| 2006/0005261 | A1* | 1/2006 | Sukigara | G06F 21/10 |
| | | | | 726/27 |
| 2006/0008256 | A1* | 1/2006 | Khedouri | G06Q 20/206 |
| | | | | 386/234 |
| 2006/0248596 | A1* | 11/2006 | Jain | G06F 21/10 |
| | | | | 726/27 |
| 2010/0046918 | A1* | 2/2010 | Takao | G11B 20/00086 |
| | | | | 386/241 |
| 2013/0257588 | A1* | 10/2013 | Kobayashi | G05B 1/00 |
| | | | | 340/5.54 |

FOREIGN PATENT DOCUMENTS

| | | |
|---|---|---|
| JP | 2008-025988 A | 2/2008 |
| JP | 2009-098794 A | 5/2009 |
| JP | 2011-100376 A | 5/2011 |
| JP | 2013-033174 A | 2/2013 |

OTHER PUBLICATIONS

Chinese Office Action dated Apr. 3, 2019, in Chinese Patent Application No. 20148003797.4 with an English translation.

* cited by examiner

Fig. 2

| Information handled by Usage Term Manager 12 | | |
|---|---|---|
| Built-in RTC Validity (BLT_RTC) | | TRUE/FALSE |
| Built-in RTC within Term (TRM_RTC) | | TRUE/FALSE |
| Synchronized with Secure RTC | | TRUE/FALSE |
| Usage validity period information | Starting Date and Time | YY/MM/DD HH:MM |
| | Expiration Date and Time | YY/MM/DD HH:MM |
| With Error Record (ALR_ERR) | | TRUE/FALSE |
| Availability Determination Result (ACCEPT_USE) | | TRUE/PENDING1/ PENDING2/FALSE |
| Information handled by Control Authorization Manager 13 | | |
| Transition to Power-ON State | | |
| | Projector Status Check | TRUE/FALSE |
| | Video Display Unit Initialization | TRUE/FALSE |
| | Video Displayability Determination | TRUE/FALSE |
| | Light Source-ON | TRUE/FALSE |
| Transition to Display-ON State | | |
| | Shutter-Open | TRUE/FALSE |

DISPLAY DEVICE, USAGE MANAGEMENT METHOD AND PROGRAM OF A DISPLAY DEVICE

TECHNICAL FIELD

The present invention relates to a display device, in particular, relating to a display device that has an expiration date of use and can confirm that upon use of the device, the current date and time is within the usage validity period as well as relating to a usage management method and program for the display device.

BACKGROUND ART

Of projectors used as display devices, there are some large-scale projectors that are rented for digital cinemas and for other purposes. Such a projector is specified with a usage validity period (contract period) on a contract. This kind of projector is used to perform projection after confirming that the current time is within the usage validity period based on a secure clock.

It is difficult to use a real-time clock incorporated in the projector (which will be referred to, hereinbelow, as built-in clock) as a secure clock because of the following aspects.

There are some built-in RTCs (Real Time Clock) that do not use battery back-up in order to keep the price of the projector as low as possible and/or in order to make the projector maintenance-free. Though there are some projectors that use a high-capacity capacitor called a super capacitor to perform back-up of the built-in RTC, even such a projector using a super capacitor has to be activated as often as once every two weeks. Since, if the projector has not been activated for two weeks or more, the power supply from the super capacitor runs out and the value of the built-in RTC returns to an initialized state, it is difficult to confirm whether the device has been used within the time limit for use.

It is possible to use a technology that allows a value to be retained for 5 years or longer even after the power supply has been depleted. However, this needs management of setting changes of the built-in RTC, specifically, management of the monthly accuracy rate of the built-in RTC, management of the authority to change settings, recording of the security log, management of the limit time to which change is permitted per year and others, which gives rise a cost increase problem.

Due to the above described problems, it is difficult to develop a rental-use projector which has a function that prevents illicit use by checking use of the projector during the contract period based only on the built-in RTC.

For this reason, the practice (thinking) is to use a secure clock that is supplied from an external source to ensure that the built-in RTC is synchronized with the secure clock, according to which (based on which) the operation to confirm that the device is used within the aforementioned time limit is performed after waiting until the synchronized state has been established.

The projector disclosed in Patent Document 1 has a network connecting function and a real-time clock function and acquires the time from an NTP (Network Time Protocol) server via the network, in order to turn the projection of video on and off at the previously registered times.

RELATED ART DOCUMENTS

Patent Documents

Patent Document 1: JP2009-98794A

DISCLOSURE OF THE INVENTION

Problems to be Solved by the Invention

The projector disclosed in Patent Document 1 is configured to obtain correct date information from an external device, i.e., an NTP server for a secure clock, in order to assure the reliability of the built-in RTC.

However, it is thought that there are places, where the projector is installed, at which the internet cannot be accessed, or even if there are areas where the internet can be accessed, obtaining date information from an NTP server would actually take a long time.

Further, each time, during boot-up, when preparation to use the projector is started, after accessing the external device to obtain correct date information, the boot-up takes a long time and this places stress on the user. Examples of preparations that consume time to set up the projector for a projection operation may include confirming the device's internal status, various kinds of initial settings and various operating conditions and the like.

The present invention is to provide a display device that has a valid time limit for use and to verify that the time limit falls within the expiration period (date) during which the display device is to be used, to improve convenience of use, to ensure that the display can be quickly used, as well as to provide a management method for managing use of the device and a program for the display device.

Means for Solving the Problems

A display device according to the present invention includes
a real-time clock; and,
a control unit that, if the status of the real-time clock is invalid, upon receiving a video display-ON signal to turn on display of an image, displays an image corresponding to an input video signal.
A usage management method of a projector according to the present invention is a usage management method implemented in a display device including a real-time clock and having a fixed usage validity period, and is constructed such that
when receiving a video display-ON signal for turning on video display if the status of the real-time clock is invalid, a control unit displays an image corresponding to an input video signal.
A program according to the present invention is a program for use in a display device including a real-time clock and having a fixed usage validity period and causes a control unit to implement display of an image corresponding to an input video signal when the control unit receives a video display-ON signal for turning on video display if the status of the real-time clock is invalid.

Effect of the Invention

In the thus constructed invention, it is possible to achieve improved convenience and to ensure that the display can be quickly used.

MODE FOR CARRYING OUT THE INVENTION

Next, the exemplary embodiment of the present invention will be described with reference to the drawings.

Figure 1:
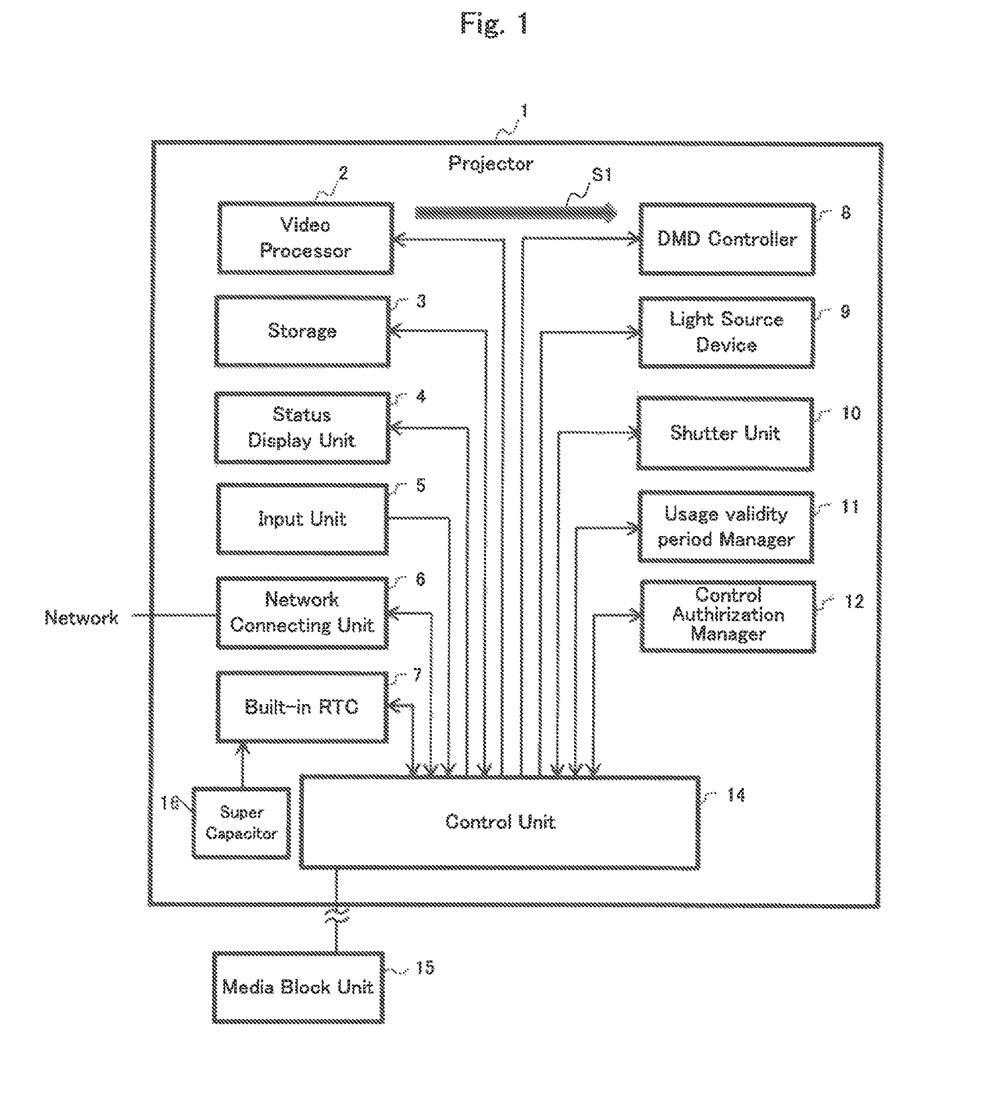
FIG. 1 A block diagram showing essential components of one exemplary embodiment of a projector according to the present invention.

FIG. 1 is a block diagram showing essential components of one exemplary embodiment of a projector according to the present invention.

Projector 1 of the present exemplary embodiment is a large-scale projector to be rented for digital cinema and the like, and includes video processor 2, storage 3, status display 4, input unit 5, network connecting unit 6, built-in RTC 7, DMD (Digital Micro mirror Device) controller 8, light source driver 9, shutter unit 10, usage validity period manager 11, control authorization manager 12, control unit 14 and super capacitor 16. Control unit 14 is connected to medial block section 15 that also serves as a secure clock provided outside projector 1. Here, media block unit 15 may be a device such as a STB (set top box) or the like, or may be an option board or the like that is connected to an option terminal of projector 1.

Video processor 2 generates drive signal S1 based on the video signals given from control unit 14 and supplies the signal to DMD controller 8. Video processor 2 performs, for example, a resolution converting process for converting the resolution of the input video signal to that of the display unit and a color converting process and gamma correcting process for performing correction to optimize the color of the input video signal. DMD controller 8 drives multiple mirror elements constituting the DMD (not shown) as a display device, in accordance with drive signal S1. DMD controller 8 as well as the DMD is one example of a video display unit. The video display unit may comprise a liquid crystal panel as a display device and a liquid crystal panel controller for driving the liquid crystal panel. Storage 3 stores programs for operating control unit 14. Status display unit 4 is composed of a miniature liquid crystal panel for text display, alarm LEDs and the like to display the operation status of projector 1. Input unit 5 receives an input such as an input for power activation from the device user. Network connecting unit 6 establishes connection to the internet, LAN (Local Area Network) and the like. Built-in RTC 7 is an RTC (real-time clock) that is backed up by super capacitor 16 and synchronized with an externally supplied secure clock, and can operate about two weeks after power supply to projector 1 is cut off.

Light source drive unit 9 drives a light source (not shown) controlled by control unit 14. In the present exemplary embodiment, the light source uses a solid-state light source formed of LEDs (Light Emitted Diode). As solid-state light sources, semiconductor lasers may be used instead of the above. Also, discharge tubes frequently used conventionally may be employed.

Shutter unit 10 is inserted between the aforementioned light source and the DMD and control unit 14 controls and performs opening and closing of the shutter. When the shutter is opened, light from the light source illuminates the DMD and is used for projection. When the shutter is closed, no light will be projected.

Usage validity period manager 11 stores the usage validity period information input from the network via network connecting unit 6 and control unit 14. This information is input to network connecting unit 6 in a form ciphered by an undecipherable encryption method and decoded by control unit 14, then stored into usage validity period manager 11.

Control authorization manager 12 stores the control authorization information that is configured by control unit 14 based on the information stored in usage validity period manager 11.

Control unit 14 performs control of each unit in accordance with the programs stored in storage 3. Media block 15 is one that is defined by the DCI (DCI: Digital Cinema Initiative) specification (DCI SpecificatiON, VersiON 1.2 with Errata as of 30 Aug. 2021 Incorporated) and has the following functions:

(1) a function of storing encrypted contents such as cinemas;
(2) a function of determining the usage validity period of the encryption key for decoding an encrypted content;
(3) a function of decoding encrypted content into video signals by using the encryption key to output the signals to the display device; and
(4) a secure RTC for determining the usage validity period and others.

In the present exemplary embodiment, the secure RTC provided for media block 15 is used as a secure clock. As other examples of secure clocks, NTP servers can be mentioned and used. Projector 1 has a decoded video signal input from media block 15 to display projection of the image corresponding to the input video signal.

Other than the above, projector 1 further includes a cooling mechanism that operates in combination with the projection optics for performing projection and illumination of the light source and optics for projecting the image light obtained from the DMD (both not shown).

Control unit 14 acquires a secure RTC (which will be referred to, hereinbelow, as the secure RTC) from media block unit 15 and sets the acquired secure RTC for the built-in RTC (synchronizes the built-in RTC with the RTC). Control unit 14, by referring to the usage validity period information and control authorization information stored in usage validity period manager 11 and control authorization manager 12, controls the operation of projector 1 in accordance with the output from built-in RTC 7.

Figure 2:
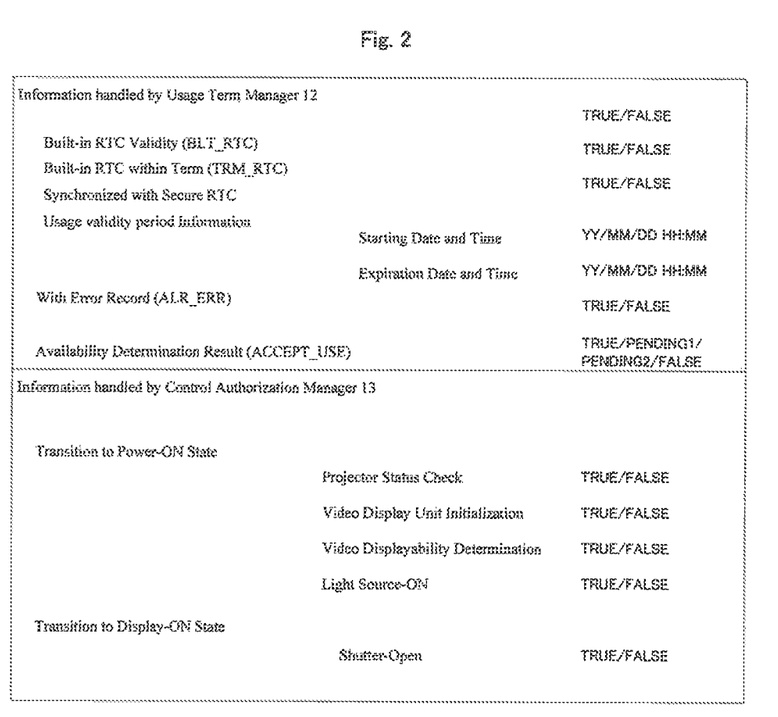
FIG. 2 A diagram showing control information lists stored in usage validity period manager 12 and control authorization manager 13 in FIG. 1.

FIG. 2 is a diagram showing control information lists stored in usage validity period manager 11 and control authorization manager 12.

To begin with, the information that usage validity period manager 11 handles will be described. The information handled by usage validity period manager 11 includes usage validity period information, built-in RTC validity (BLT_RTC), whether built-in RTC is within term (TRM_ERR), whether the RTC has been synchronized with the secure RTC (SYN_SEC), term error record (ALT_ERR) and availability determination result (ACCEPT_USE). Next, the details of each item of information will be described.

Figure 3:
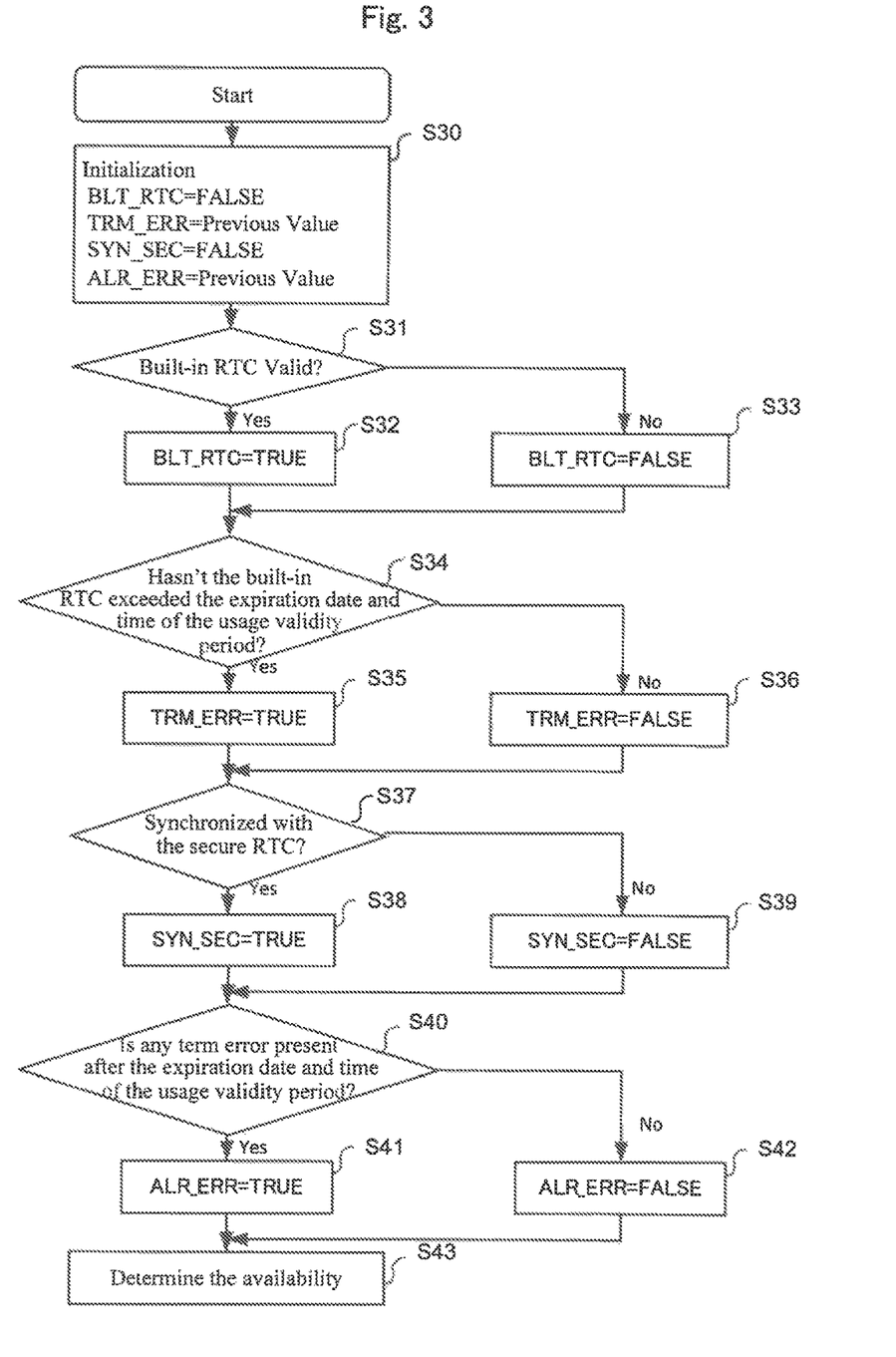
FIG. 3 A flow chart showing the operation when control information is stored into usage validity period manager 12 in FIG. 1.

FIG. 3 is a flow chart showing the operation of control unit 14 when control information is stored into usage validity period manager 11.

Initial Settings:

When power is supplied to projector 1, control unit 14 sets, as the initial settings, BLT_RTC and SYN_SEC at FALSE (invalid) and TRM_ERR and ALT_ERR at the pervious values (Step S30). As the usage validity period information, the starting date and expiration date included in the usage validity period information input to network connecting unit 6 are set. Here, the starting date and expiration date may contain a time.

Built-in RTC Validity (BLT_RTC):

Next, control unit 14 confirms the status of built RTC 7 (Step S31). Suppose that, for example, the initial value of built-in RTC 7 is set with 2000/01/01; 00:00:00, which represents 00 hours, 00 minutes, 00 seconds on Jan. 1, 2000, and if the date and time shown by the output from built-in RTC 7 is greater than the date and time of the initial value (the time has lapsed a predetermined second time or longer), the status will be determined to be TRUE (valid) (Step S32). Otherwise, the status including a case of the initial value (2000/01/01; 00:00:00) will be determined to be FALSE (invalid) (Step S33), and the result of determination will be stored. That is, when the date and time shown by the output from built-in RTC 7 does not show the date and time that has passed the predetermined second time or longer relative to the date and time of the initial value, the real-time clock is determined to be invalid. The predetermined second time is preferably set equal to or longer than the time that is taken from when power is supplied to projector 1 until the status of built-in RTC 7 is confirmed.

When the Built-in RTC is within the Valid Term (TRM_ERR):

After Step S32 or S33, control unit 14 confirms whether or not the date shown by the output from built RTC 7 exceeds the expiration date included in the usage validity period information (whether the usage validity period is expired or not) (Step S34). When the date shown by the output from built RTC 7 does not exceed the expiration date included in the usage validity period information, the status is determined to be TRUE (Step S35). When the date shown by the output from built RTC 7 exceeds the expiration date included in the usage validity period information, the status is determined to be FALSE (expired) (Step S36), and the result of determination is stored. When the date shown by the output from built RTC 7 exceeds the expiration date of the usage validity period information, control unit 14 records an error log representing a term error as follows:

2014/09/12 01:00:01(290) THE VALIDITY HAS EXPIRED.

Here, "2014/09/12 01:00:01" is the date shown by the output from built-in RTC 7 when the determination returns FALSE (Step S36), in other words, when a valid term error takes place. "290" is the code that corresponds to a valid term error. "THE VALIDITY HAS EXPIRED" is the message corresponding to a valid term error. The error log showing a valid term error is one example that shows projector 1 has a use problem, specifically, expiration of the usage validity period.

Synchronized with the Secure RTC (SYN_SEC):

After Step S35 or S36, it is confirmed whether or not built-in RTC 7 has been synchronized with the secure RTC (Step S37). After the built-in RTC has been configured by acquisition of the secure RTC, control unit 14 determines that the built-in RTC has been synchronized with the secure RTC. After built-in RTC 7 has been synchronized with the secure RTC, the determination returns TRUE (Step S38). After built-in RTC 7 has not been synchronized with the secure RTC, the determination returns FALSE (Step S39), and the result is stored. If the control unit 14 cannot acquire the secure RTC from media block unit 15, the control unit performs an RTC acquisition process for acquiring the secure RTC after a lapse of a predetermined third time. The RTC acquisition process is preferably repeated until the secure RTC can be obtained. When errors that arise in the built-in RTC are corrected or in other cases, the RTC acquisition process may be performed every lapse of a predetermined fourth time period.

Valid Term Error Record (ALR_ERR):

After Step S38 or S39, control unit 14 confirms presence/absence of error records. For example, control unit 14 checks the dates of past error logs recorded in storage 3 and the expiration date of the usage expiration information to confirm presence/absence of error records. When there is an error record after the expiration date, the determination returns TRUE (Step S41), whereas when there is no error record after the expiration date, the determination returns FALSE (Step S42), and the result is recorded. It is also possible to confirm presence/absence of an error record of a valid term error. When there is an error record of a valid term error, control unit 14 returns TRUE, whereas with no error record of a valid term error, the control unit returns FALSE.

Availability Determination Result (ACCEPT_USE):

After Step S41 or S42, control unit 14 sets a flag for limiting the status of the projector to one of the multiple levels (TRUE/PENDING1/PENDING2/FALSE), based on the above determined result and stores the result. Thereafter, the control returns to Step S31 to repeat the sequence of the above steps. Accordingly, judgement on the contents stored in usage validity period manager 11 and control authorization manager 12 is implemented constantly and the contents are rewritten successively.

Figure 4:
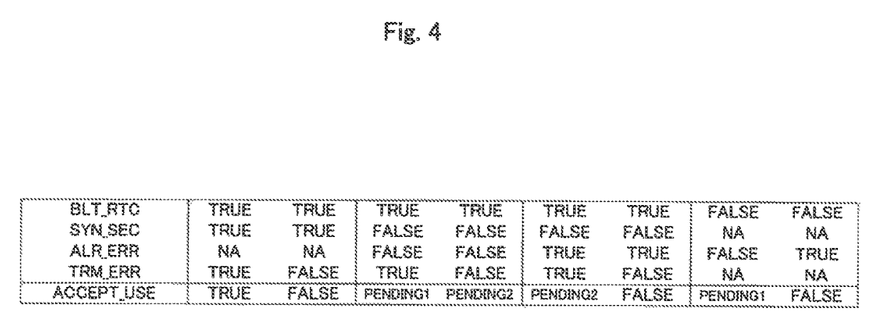
FIG. 4 A diagram showing a truth table which controller 14 uses for performing flag settings at Step S43 in FIG. 3.
Figure 5:
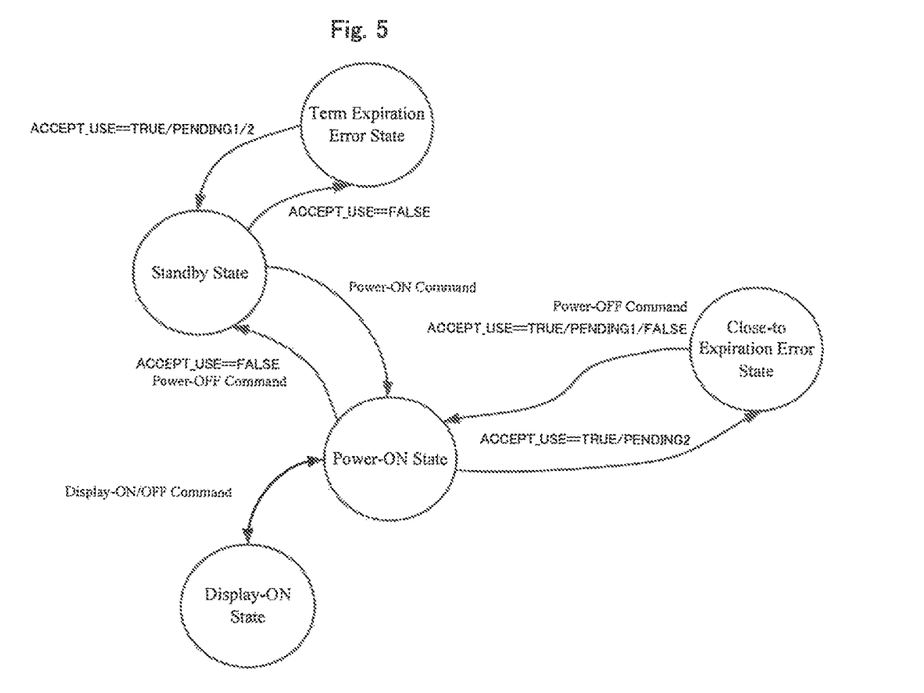
FIG. 5 A diagram showing how the operation status of projector 1 transitions in accordance with the flags set at Step S43 in FIG. 3.

FIG. 4 is a diagram showing a truth table which controller 14 uses for flag settings at Step S43. FIG. 5 is a diagram showing how the operation status of projector 1 transitions in accordance with the flags set at Step S43.

Projector 1 is put into activation state as power is supplied and starts operating. The operation status of projector 1 includes a standby state, power-ON state, display-ON state, close-to-expiration error state and term error state, as shown in FIG. 5, and the current state of the projector is displayed on display unit 4.

In the standby state and the term error state, control unit 14 activates components required for the determination process shown in FIG. 3, such as storage 3, display unit 4, network connecting unit 6 and usage validity period manager 11 of all the components of projector 1.

In the power-ON state, the close-to-expiration state and the display-ON state, control unit 14 activates video processor 2, DMD controller 8, light source driver 9, shutter unit 10 and control authorization manager 12, in addition to activating storage 3, display unit 4, network connecting unit 6 and usage validity period manager 11. Here, in the power-ON state and in the close-to-expiration error state, the shutter of shutter unit 10 is set to the closed state.

Control authorization manager 12 stores the list of items performed when transition has been made to the power-ON state and display-ON state of the above states. When the projector is put into the power-ON state, items including projector status check, video processor initialization, video displayability determination, light source-ON are to be implemented, whereas when the projector is put into the display-ON state, an item or shutter-Open is to be implemented, as shown in FIG. 2.

In the projector status check, status check of the components for the projector to perform projection, including video processor 2, DMD controller 8, light source driver 9 and the like is performed. In the video processor initialization, video processor 2 is initialized in preparation for projection. In the video displayability determination, it is determined whether or not the content to be projected is displayable. In the present exemplary embodiment for displaying video from media block unit 15, media block marriage reception can be mentioned for example. Other than this, a determination needs to be made whether or not the content of certain kinds of signals can be displayed from the point of view of copyright violation. In the light source-ON, light source driver 9 is made to drive the light source. In the shutter-Open, shutter unit 10 is put into open state.

In control authorization manager 12, either TRUE or FALSE is selected for each of the above items, and control unit 14 implements the items set with TRUE. Control unit 14 performs setting of TRUE/FALSE for each item in accordance with the availability determination result from usage validity period manager 11.

Next description will be made on individual operational states and transitions shown in FIG. 5.

Standby State

The projector supplied with power is set into the standby state. The process shown in FIG. 3 is performed periodically so as to update the items shown in the truth table in FIG. 4, as required. This process is implemented periodically, not only in the standby state but also in other states.

In the standby state, when input unit 5 receives input of power-ON from the device user, the operation transitions to the power-ON state. When ACCEPT_USE is determined to be FALSE, the operation transitions to the term error state.

Term Error State

The operation mode will stay in this state until ACCEPT_USE changes to any of TRUE, PENDING1 and PENDING2, or as long as ACCEPT_USE remains FALSE, and transitions to the standby state when it changes to other than FALSE.

In the term error state, even if input unit 5 receives input of power-ON from the device user, the operation mode will not transition to another state, e.g., the power-ON state. That is, no power is supplied to video processor 2, DMD controller 8, light source driver 9, shutter unit 10, control authorization manager 12 and the like (not activated).

Power-ON State

The TRUE/FALSE settings of the four items of control information in the power-ON state transition in FIG. 2, namely, projector status check, video processor initialization, video displayability determination, light source-ON, are checked, and the items set with TRUE are implemented. This implementation is practiced aiming at previously performing the procedures required for display, so that display can be performed as soon as the operation mode transitions to the display-ON state.

When the setting of ACCEPT_USE changes to FALSE, or when input unit 5 receives input of Power-OFF from the device user, the operation mode transitions to the standby state. When the setting of ACCEPT_USE changes to PENDING2, the operational mode transitions to the close-to-expiration error state. When input unit 5 receives input of a display-ON command for display-ON from the device user, the operation mode transitions to the display-ON state after completing preparations to start the display device The display-ON command is one example of a video display-ON signal for turning on the video display.

Close-to-Expiration Error State

The TRUE/FALSE settings of the four items of control information in the power-ON state transition in FIG. 2 are checked, and the items set with TRUE are effected. Here, the items that have been effected at the power-ON state are kept as they are and need not be repeated.

The operation mode will stay in this state until ACCEPT_USE changes to TRUE, PENDING1 or FALSE, or as long as ACCEPT_USE remains PENDING2 and transitions to the Power-ON state when it changes to a state other than PENDING2.

Display-ON State

The TRUE/FALSE setting of the shutter-Open as the control information in the display-ON state transition in FIG. 2 is checked, and when the item is set at TRUE, shutter unit 10 is put into Open state. Video projection starts only after this state. Specifically, the video corresponding to the input video signal supplied from the outside is displayed.

The transition from the display-ON state to the power-ON state is adapted to be unaffected by a change of the determination of ACCEPT_USE, and transition to the power-ON state takes place when input unit 5 receives a display-OFF command for turning off display from the apparatus user. In other words, even if a term error has occurred, the display-ON state is continued. As a result, even if, for example, the projector has reached the expiration date of use while projection (screening) is being performed, hence the setting of ACCEPT_USE changes to FALSE or PENDING2, the projection (screening) state is continued and will not be interrupted. The display-OFF command is one example of a video display-OFF signal for turning off video display.

When display has been performed with the built-in RTC out of synchronization with a secure RTC, if the state in which no secure RTC is acquired, or the state in which synchronization cannot be established, continues for a predetermined first period, control unit 14 records an error log showing that synchronization with the secure RTC has not been established for the predetermined first period of time or longer (term error), into storage 3. By recording the error log showing term error, it is possible to disable the display function when the projector is used next until the usage validity is confirmed after synchronization with the secure RTC. The error log showing term error is one example of information indicating that use of projector 1 entails a problem such that, for example, the usage validity of the projector is expired.

In the exemplary embodiment thus configured, when the setting of ACCEPT_USE is TRUE or PENDING1, projector 1 is put into the power-ON state by a power-ON command, and can transition to the display-ON state or becomes able to perform projection.

The state where ACCEPT_USE is determined to be PENDING1 does not require the validity of the built-in RTC but is conditioned not to indicate of expiration of the usage period. Under this condition, in the present exemplary embodiment the operation mode can be transitioned to the power-ON state. Then, when the power-ON state is activated by a power-ON command, projection (video display) is prepared, and projection starts after a display-ON command is given.

As specific preparations of projection, video display unit initialization, setting of input terminals for selecting content and the like can be performed beforehand in addition to projector status check, video processor initialization and video displayability determination. Further, in the case where the light source is driven in the power-ON state, setup of the projected image size and luminance can be done beforehand. Moreover, since aging of the light source can be done beforehand, it is possible to stabilize luminance change and color change of the image due to, for example, temperature drift etc., while the usage validity term is being checked.

In this way, in the present exemplary embodiment, even in a state where no secure clock is supplied, preparation is effected based on the built-in RTC mode, hence it is possible to use the projector quickly.

Also, since projection is adapted to stop when a display-OFF command is received from the apparatus user, the projection will not be abruptly stopped, hence it is possible to perform suitable management of the projector without putting any stress on the apparatus user.

Further, when confirmation is determined as to whether or not a term error has been made after the expiration date and expiration of the usage period, and ALR_ERR is TRUE, ACCEPT_USE returns PENDING2 or FALSE so that it becomes impossible to perform display of the video signal supplied from the outside. Accordingly, the lender of the projector can lend it out without anxiety.

In the present exemplary embodiment, the light source is turned on at the power-ON state. However, instead of turning the light source on at the power-ON state, the light source may be turned on together with shutter-Open when the operation mode is made to transition to the display-ON state.

As a method for producing an effect equivalent to that of the shutter—being closed in the power-ON state, an image that is not based on the input video signal but that is generated inside the projector, for example, a solid black image or a predetermined image (having a manufacturer's logo, etc.), may be displayed. In this case, when a light source, such as a lamp or the like, is put into an illumination state, it is possible to assure, in advance, that the state will be stable as regards temperature and other conditions. Further, if the light source is turned on with the shutter closed, it is expected that the temperature of the shutter will become high, thus causing problems. However, this situation can be prevented.

In the present exemplary embodiment, though the shutter unit is arranged between the light source and the DMD, a shutter unit is not essential. For example, when a shutter unit is not provided, the turn-on state and turn-off state of the light source, or the displayed state and non-displayed state of video display can used. The displayed state of video display is a state in which the input video is displayed, whereas the non-displayed state is a state in which no input video is displayed.

As a method of determining whether the usage validity period has elapsed in a state in which secure RTC information cannot be acquired, if transitions between the power-ON state and the standby state are logged, it is possible to determine the usage validity period from the differential information between the latest date of activation and the expiration date and the average time (two weeks in the present exemplary embodiment) of the built-in RTC being cleared when no power has been supplied.

2014/09/12 01:00:01 POWER OFF
2014/09/12 01:01:12 POWER ON [LAMP: OFF] (OK)

When the status of the built-in RTC is invalid and the above log has been recorded, the current time is expected to have elapsed two weeks or more after the power-OFF. Based on this expected time, it is possible to confirm whether the current time has passed the expiration date.

Although, in the present exemplary embodiment, built-in RTC 7 is backed up by super capacitor 16, but back-up is not essential. In this case, with super capacitor 16 removed, built-in RTC 7 is invalid from the time when the display device is powered on until the built-in RTC is set up by acquiring the secure RTC.

Though, in the present exemplary embodiment, a display-ON command and display-OFF command are respectively used as the video display turn-on signal and video display turn-off signal for turning the video input from the outside on or off, a power-ON command and power-OFF may be used instead. In this case, the control unit may and should perform transition to the power-ON state when receiving a power-ON command in the standby state, and then perform the same process as that when receiving a display-ON command in the power-ON state. On the other hand, when receiving a power-OFF command in the display-ON state, the control unit may and should perform the same process as that when receiving the display-OFF command to transition to the power-ON state, and perform the same process as that when receiving a power-OFF command in the power-ON state.

The display device need not be a projector but may be a display. In this case, the light source is a back light such as LEDs, fluorescent tubes and the like.

Here, the display device may further include a built-in RTC monitoring unit that compares the built-in RTC with the secure RTC acquired from the outside and notifies the result to the control unit. In this case, it becomes possible to correct records such as error logs that have occurred while the built-in RCT is not synchronized with the secure RTC.

The most characteristic feature of the present invention is the operation of control unit 14. Control unit 14 performs operation in accordance with the programs stored in storage 3. The programs may be ones that have been previously stored in the storage or may be ones that are stored into the storage via an interface connecting unit. Included in the present invention are not only programs but also storage media that store the programs.

The illuminating device and projector according to the first to third exemplary embodiments described above are mere examples of the present invention, and the structure and operation can be changed as appropriate.

The present invention can take the configurations described in the following Appendixes 1 to 12, but should not be limited to these configurations.

[Appendix 1] A display device comprising:
 a real-time clock; and,
 a control unit that, when receiving a video display-ON signal for turning on video display under the condition that the status of the real-time clock is invalid, displays video corresponding to an input video signal.

[Appendix 2] The display device according to Appendix 1, wherein
 the control unit synchronizes an acquired secure clock with the real-time clock, and confirms whether or not the usage validity period of the display device has expired based on the output from the real-time clock.

[Appendix 3] The display device according to Appendix 2, wherein
 when the status of the real-time clock is valid and has been synchronized with the secure clock and the usage validity period has not expired, the control unit, upon receiving the video display-ON signal, displays the video corresponding to the input video signal.

[Appendix 4] The display device according to Appendix 3, further comprising a storage, wherein
 the control unit records information indicating expiration of the usage validity period after the usage period has expired.

[Appendix 5] The display device according to Appendix 4, further comprising a video processor, wherein when the status of the real-time clock is invalid while the storage has information indicating expiration of the usage validity period, the control unit will not activate, at least, the video processor even if the video display-ON signal is received.

[Appendix 6] The display device according to Appendix 4 or 5, wherein the control unit records information indicating expiration of the usage validity period after been unable to acquire the secure clock for a first period of time or longer.

[Appendix 7] The display device according to any one of Appendixes 1 to 6, wherein when the display device is supplied with power, the control unit confirms the status of the real-time clock.

[Appendix 8] The display device according to any one of Appendixes 1 to 7, wherein if the usage validity period expires while video corresponding to the input video signal is being displayed, the control unit continues displaying the video corresponding to the input video signal.

[Appendix 9] The display device according to any one of Appendixes 1 to 8, wherein when the date and time shown by the real-time clock has not elapsed a second predetermined period of time or longer from the initial value of date and time, the status of the real-time clock is invalid.

[Appendix 10] The display device according to Appendix 9, wherein the second period of time is equal to or longer than the time required to confirm the status of the real-time clock after the supply of power to the display device is started.

[Appendix 11] A usage management method implemented in a display device including a real-time clock, wherein when receiving a video display-ON signal for turning on video display under the condition that the status of the real-time clock is invalid, a control unit displays video corresponding to an input video signal.

[Appendix 12] A program for use in a display device including a real-time clock, causing a control unit to enable display of video corresponding to an input video signal when the control unit receives a video display-ON signal for turning on video display under the condition that the status of the real-time clock is invalid.

DESCRIPTION OF REFERENCE NUMERALS 1 projector
2 video processor
3 storage
4 status display
5 input unit
6 network connecting unit
7 built-in RTC
8 DMD controller
9 light source driver
10 shutter unit
11 usage validity period manager
12 control authorization manager
14 control unit
15 media block unit
16 super capacitor

The invention claimed is:

1. A display device, comprising:
a real-time clock;
a video display;
a storage that stores control instructions for controlling operations on the display device; and
a control unit executing control instructions from the storage for implementing transitions between a plurality of different operation states for the display device, the transitions being based on current values of a multi-level availability flag, a level of the availability flag being periodically updated based on predefined logical combinations of current values of a plurality of flags respectively reflecting current control information related to timing,
wherein an initial value is respectively set to each flag of the plurality of flags upon an initial power up of the display device, the initial power up causing the control unit to place the display device into a standby operation state,
such that, in the standby operation state, when a Power-ON command is received and when a video display-ON signal for turning on a display of video is received by the control unit under a condition in which a date and a time shown by the real-time clock are invalid and when a value of the availability flag indicates a pending timing status, the control unit changes into a Display-ON operation state during which a control is provided to the video display to display video corresponding to an input video signal even though the real-time clock indicates an invalid status.

2. The display device according to claim 1, wherein the control unit synchronizes an acquired secure clock with the real-time clock, and confirms whether or not a usage validity period of the display device has expired based on an output from the real-time clock.

3. The display device according to claim 2, wherein when the status of the real-time clock is valid and has been synchronized with the secure clock and the usage validity period has not expired, the control unit, upon receiving the video display-ON signal, permits the video corresponding to the input video signal to be displayed.

4. The display device according to claim 3, wherein the control unit records, in the storage, information indicating an expiration of the usage validity period after a usage period has expired.

5. The display device according to claim 4, further comprising a video processor, wherein, when the date and time of the real-time clock are invalid while the storage has information indicating the expiration of the usage validity period, the control unit will not activate, at least, the video processor even if the video display-ON signal is received.

6. The display device according to claim 4, wherein the control unit records information indicating the expiration of the usage validity period when having been unable to acquire the secure clock for a first period of time or longer.

7. The display device according to claim 1, wherein, when the display device is supplied with power, the control unit confirms the status of the real-time clock.

8. The display device according to claim 1, wherein, if a usage validity period expires while video corresponding to the input video signal is being displayed, the control unit continues displaying the video corresponding to the input video signal.

9. The display device according to claim 1, wherein, when the date and time shown by the real-time clock have not elapsed a second predetermined period of time or longer from an initial value of the date and time, the status of the real-time clock is invalid.

10. The display device according to claim 9, wherein the second predetermined period of time is equal to or longer than a time required to confirm the status of the real-time clock after a supply of power to the display device is started.

11. The display device according to claim 1, wherein a status of the real-time clock is valid if a value of an output of the real-time clock is greater by at least a predetermined amount from an initial value, and is invalid otherwise.

12. The display device according to claim 10, wherein the second predetermined period of time comprises an input into a determination of the pending timing status as a value for the availability flag.

13. A usage management method implemented in a display device including a real-time clock, wherein, when receiving a video display-ON signal for turning on a display of video under a condition in which a date and a time shown by the real-time clock are invalid, a control unit displays video corresponding to an input video signal, based on a value of a multi-level availability flag indicating a pending status relative to the real-time clock, wherein the control unit implements transitions between a plurality of different operation states for the display device, the transitions being based on current values of the multi-level availability flag, a level of the availability flag being periodically updated based on predefined logical combinations of current values of a plurality of flags respectively reflecting current control information related to timing, wherein an initial value is respectively set to each flag of the plurality of flags upon an initial power up of the display device, the initial power up causing the control unit to place the display device into a standby operation state, such that, in the standby operation state, when a Power-ON command is received and when a video display-ON signal for turning on a display of video is received by the control unit under a condition in which a date and a time shown by the real-time clock are invalid and when a value of the availability flag indicates a pending timing status, the control unit changes into a Display-ON operation state during which a control is provided to the video display to display video corresponding to an input video signal even though the real-time clock indicates an invalid status.

14. A machine-readable, non-transitory, tangible medium storing a set of machine-readable instructions to execute the method according to claim 13 for use in a display device including a real-time clock.

15. The medium according to claim 14, wherein the status of the real-time clock is valid if a value of an output of the real-time clock is greater by at least a predetermined amount from an initial value, and is invalid otherwise.

* * * * *